US012686934B2

(12) United States Patent
Schjødt et al.

(10) Patent No.: US 12,686,934 B2
(45) Date of Patent: *Jul. 21, 2026

(54) METHOD FOR GENERATING GAS MIXTURES COMPRISING CARBON MONOXIDE AND CARBON DIOXIDE FOR USE IN SYNTHESIS REACTIONS

(71) Applicant: HALDOR TOPSØE A/S, Kgs. Lyngby (DK)

(72) Inventors: Niels Christian Schjødt, Hvalsø (DK); Rainer Küngas, Copenhagen (DK); Berit Hinnemann, Stenløse (DK); Bengt Peter Gustav Blennow, Humlebæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 813 days.

This patent is subject to a terminal disclaimer.

(21) Appl. No.: 17/046,050

(22) PCT Filed: Apr. 11, 2019

(86) PCT No.: PCT/EP2019/059204
§ 371 (c)(1),
(2) Date: Oct. 8, 2020

(87) PCT Pub. No.: WO2019/197515
PCT Pub. Date: Oct. 17, 2019

(65) Prior Publication Data
US 2021/0054510 A1     Feb. 25, 2021

(30) Foreign Application Priority Data

Apr. 13, 2018     (DK) ............................ PA 2018 00155

(51) Int. Cl.
| | |
|---|---|
| *C25B 15/08* | (2006.01) |
| *C25B 1/042* | (2021.01) |
| *C25B 1/23* | (2021.01) |
| *C25B 9/19* | (2021.01) |
| *C25B 9/70* | (2021.01) |
| *C25B 13/07* | (2021.01) |

(52) U.S. Cl.
CPC ............ *C25B 15/081* (2021.01); *C25B 1/042* (2021.01); *C25B 1/23* (2021.01); *C25B 9/19* (2021.01); *C25B 9/70* (2021.01); *C25B 15/08* (2013.01); *C25B 13/07* (2021.01); *C25B 15/083* (2021.01); *Y02E 60/36* (2013.01)

(58) Field of Classification Search
CPC ........... C25B 15/081; C25B 1/23; C25B 1/00; C25B 1/04; C25B 1/042; C25B 15/08; C01B 32/40
See application file for complete search history.

(56) References Cited

U.S. PATENT DOCUMENTS

| | | | |
|---|---|---|---|
| 7,365,234 B2 | 4/2008 | Subramaniam et al. | |
| 7,750,494 B1 | 7/2010 | Behrens et al. | |
| 8,568,581 B2 | 10/2013 | Sivasankar et al. | |
| 12,215,432 B2 * | 2/2025 | Schjødt .................. | C01B 32/40 |
| 2008/0023338 A1 | 1/2008 | Stoots et al. | |
| 2009/0014336 A1 | 1/2009 | Olah et al. | |
| 2011/0206566 A1 | 8/2011 | Stoots et al. | |
| 2011/0253550 A1 | 10/2011 | Hoffmann | |
| 2012/0201717 A1 | 8/2012 | Singh et al. | |
| 2013/0178657 A1 | 7/2013 | Franke et al. | |
| 2014/0194539 A1 | 7/2014 | Hammad et al. | |
| 2014/0288195 A1 | 9/2014 | Castelli et al. | |
| 2014/0291162 A1 | 10/2014 | Sala et al. | |
| 2015/0057458 A1 * | 2/2015 | Schjodt .................... | C25B 1/02 |
| | | | 562/521 |
| 2015/0329979 A1 * | 11/2015 | Reytier ..................... | C25B 9/75 |
| | | | 204/244 |

(Continued)

FOREIGN PATENT DOCUMENTS

| | | |
|---|---|---|
| AU | 2009313838 A1 | 5/2010 |
| JP | 2010-533784 A | 10/2010 |

(Continued)

OTHER PUBLICATIONS

Jin et al, "Homogeneous Catalytic Hydroformylation of 1-Octene in CO2-Expanded Solvent Media," Chemical Engineering Science, 59 (2004) 4887-4893 (Year: 2004).*

Kazempoor et al, Hydrogen and Synthetic Fuel Production using High Temperature Solid Oxide Electrolysis Cells (SOECs). International Journal of Hydrogen Energy, 40 (2015) 3599-3612 (Year: 2015).*

Kazempoor, P. et al. "Hydrogen and synthetic fuel production using high temperature solid oxide electrolysis cells (SOECs)" Elsevier, International Journal of Hydrogen Energy, vol. 40, 2015, pp. 2599-3612.

(Continued)

*Primary Examiner* — Luan V Van
*Assistant Examiner* — Alexander R. Parent
(74) *Attorney, Agent, or Firm* — Boone IP Law

(57) ABSTRACT

A method for the generation of a gas mixture comprising carbon monoxide, carbon dioxide and optionally hydrogen for use in hydroformylation plants or in carbonylation plants, including mixing an optional steam with carbon dioxide in the desired molar ratio, feeding the resulting gas to a solid oxide electrolysis cell (SOEC) or an SOEC stack at a sufficient temperature for the cell or cell stack to operate while effecting a partial conversion of carbon dioxide to carbon monoxide and optionally of steam to hydrogen, removing some or all the remaining steam from the raw product gas stream by cooling the raw product gas stream and separating the remaining product gas from a liquid, and using said gas mixture containing CO and CO$_2$ for liquid phase synthesis reactions utilizing carbon monoxide as one of the reactants while recycling CO$_2$ to the SOEC or SOEC stack.

8 Claims, No Drawings

(56) References Cited

U.S. PATENT DOCUMENTS

| | | | | |
|---|---|---|---|---|
| 2016/0040311 A1* | 2/2016 | Jakobsson | ................. | C25B 1/00 |
| | | | | 205/347 |
| 2016/0053388 A1 | 2/2016 | Reytier et al. | | |
| 2017/0218404 A1* | 8/2017 | Simpson | ................. | C12P 7/065 |
| 2018/0066371 A1 | 3/2018 | Hong et al. | | |
| 2018/0086985 A1* | 3/2018 | von Olshausen | ....... | C25B 15/02 |
| 2019/0249317 A1* | 8/2019 | Schmid | ..................... | C25B 1/00 |
| 2020/0095124 A1* | 3/2020 | Rueger | ................... | C01B 3/382 |

FOREIGN PATENT DOCUMENTS

| | | | |
|---|---|---|---|
| JP | 2016-511296 A | 4/2016 | |
| JP | 2016-522166 A | 7/2016 | |
| WO | 2007025280 A2 | 3/2007 | |
| WO | 2007109549 A2 | 9/2007 | |
| WO | 2008/016728 A2 | 2/2008 | |
| WO | 2008124538 A1 | 10/2008 | |
| WO | 2013164172 A1 | 11/2013 | |
| WO | 2014107561 A1 | 7/2014 | |
| WO | 2017014635 A1 | 1/2017 | |
| WO | 2017141138 A1 | 8/2017 | |
| WO | 2018051334 A1 | 3/2018 | |
| WO | WO-2018054627 A1 * | 3/2018 | ............... C25B 1/00 |

OTHER PUBLICATIONS

Fang, J., et al., "Economic and Environmental Impact Analyses of Catalytic Olefin Hydroformylation in CO2-Expanded Liquid (CXL) Media," Ind. Eng. Chem. Res., 46, pp. 8687-8692 (2007).

Fujita, S., et al., "Hodroformylation of Cyclohexene with Carbon Dioxide and Hydrogen Using Ruthenium Carbonyl Catalyst: Influence of Pressures of Gaseous Components," International Journal of Molecular Sciences, 8, pp. 749-759 (2007).

Gaudillere, C., et al. "Syngas production at intermediate temperature through $H_2O$ and $CO_2$ electrolysis with a Cu-based solid oxide electrolyzer cell," ScienceDirect, International Journal of Hydrogen Energy, 39, pp. 3047-3054 (2014).

Hong, J., et al., "Homogeneous catalytic hydroformylation of 1-octene in CO2-expanded solvent media," Chemical Engineering Science, 59, 4887-4893 (2004).

International Search Report and Written Opinion issued in corresponding International Patent Application No. PCT/EP2019/059201, 9 pages (Jul. 22, 2019).

International Search Report and Written Opinion issued in corresponding International Patent Application No. PCT/EP2019/059204, 10 pages (Jun. 19, 2019).

Jin H., et al., "Homogeneous catalytic hydroformylation of 1-octene in CO2-expanded solvent media," Chemical Engineering Science, 59, pp. 4887-4893 (2004).

Jin H., et al., "Intensification of Catalytic Olefin Hydroformylation in CO2-Expanded Media," AIChE Journal, 52:7, pp. 2575-2581 (2006).

Lizhen, G., et al., "Demonstration of direct conversion of CO2/H2O into syngas in a symmetrical proton-conducting solid oxide electrolyzer," ScienceDirect, International Journal of Hydrogen Energy, 41, pp. 1170-1175 (2016).

Search Report issued in corresponding Danish Patent Application No. PA201800155, 8 pages (Oct. 9, 2018).

Search Report issued in corresponding Danish Patent Application No. PA201800156, 8 pages (Nov. 6, 2018).

Wang, Y., et al., "Syngas production on a symmetrical solid oxide H2O/CO2 co-electrolysis cell with Sr2Fe1.5Mo0.5O6—Sm0.2Ce0.8O1.9 electrodes," Journal of Power Sources, 305, pp. 240-248 (2016).

Zhao, K., et al., "Reverse water gas shift reaction over $CuFe/Al_2O_3$ catalyst in solid oxide electrolysis cell," Chemical Engineering Journal, 336, pp. 20-27 (2018).

Office Action (Notice of Reasons for Refusal) issued on Mar. 10, 2023, by the Japanese Patent Office in corresponding Japanese Patent Application No. 2020-555377, and an English Translation of the Office Action. (10 pages).

U.S. Appl. No. 18/987,417, Niels Christian Schjødt, filed Dec. 19, 2024.

Bala Subramaniam: "Exploiting Neoteric Solvents for Sustainable Catalysis and Reaction Engineering: Opportunities and Challenges," Industrial & Engineering Chemistry Research, vol. 49, No. 21, Nov. 3, 2010, pp. 10218-10229, XP055672451.

Bala Subramaniam, et al: "Supercritical Fluids and Gas-Expanded Liquids as Tunable Media for Multiphase Catalytic Reactions," Chemical Engineering Science, Oxford, GB, vol. 115, Mar. 13, 2014, pp. 3-18, XP028866670.

Hong Jin, et al "Intensification of Catalytic Olefin Hydroformylation in Co2-Expanded Media," AIChE Journal, vol. 52, No. 7, Apr. 26, 2006, pp. 2575-2581, XP055241173.

European Patent Office Communication Pursuant to Article 94(3) EPC for Application No. 19718625.7 dated Feb. 4, 2026, 7 pages.

* cited by examiner

METHOD FOR GENERATING GAS MIXTURES COMPRISING CARBON MONOXIDE AND CARBON DIOXIDE FOR USE IN SYNTHESIS REACTIONS

TECHNICAL FIELD

The present invention relates to a method for generating gas mixtures comprising carbon monoxide and carbon dioxide and their use in synthesis reactions, especially hydroformylation and carbonylation reactions.

BACKGROUND

Carbon monoxide has a rich chemistry which has found many uses within the chemical industry (see e.g. R. A. Sheldon (ed.), "Chemicals from Synthesis Gas", Reidel/Kluwer Dordrecht (1983)). Thus, several chemicals are produced with CO as one of the reactants, and such reactions are termed carbonylation reactions. Some carbonylation processes, such as methanol synthesis, rely on gas phase conversion. In many cases, however, the carbonylation reaction is performed in a liquid phase. Thus, methanol carbonylation to acetic acid or acetic anhydride, hydroformylation of alkenes to aldehydes and/or alcohols and Reppe carbonylations of alkynes or alkenes to carboxylic acids and derivatives thereof are all conducted in a liquid phase pressurized with a carbon monoxide containing gas. The present invention relates to such liquid phase carbonylation processes.

Regarding the hydroformylation reaction, it has been shown that the rate may be increased up to four-fold if the reaction is conducted in so-called CXL (CO$_2$-expanded liquid) media (see e.g. H. Jin & B. Subramaniam, *Chemical Engineering Science* 59 (2004) 4887-4893 and H. Jin et al., *AIChE Journal* 52 (2006) 2575-2581). Pressurizing an organic solvent with CO$_2$ makes the solvent expand, and the diffusivity and solubility of other (reactant) gases are increased compared to the neat solvent. The use of CXL media is a general way of intensifying liquid phase catalytic reactions, such as carbonylations. However, a source of CO$_2$ as well as a source of CO (and a source of H$_2$ in the case of hydroformylation) need to be provided, which is not always feasible and under all circumstances will increase the complexity of the front-end.

A sustainable source of CO is CO$_2$. By means of a solid oxide electrolysis cell (SOEC) or an SOEC stack, CO$_2$ can be electrolyzed to CO. Furthermore, using the same SOEC or SOEC stack, H$_2$ can be generated from H$_2$O. One limitation, however, is that the SOEC cannot operate at full conversion due to heavy formation of carbon or carbonaceous compounds in the cell. If pure CO (or CO/H$_2$) is desired, it is necessary to separate the unconverted CO$_2$, e.g. by means of a pressure swing adsorption (PSA) unit. However, a PSA unit is expensive and adds substantially to the cost of the entire process.

SUMMARY

Now it has turned out that, by the present invention, these problems combined can be turned into an advantage. Using CO$_2$ (and optionally H$_2$O) as feed for an SOEC or SOEC stack operating at moderate (e.g. 25%) conversion, a stream of CO (and optionally H$_2$) in CO$_2$ is obtained, which can be used as the gaseous feed for catalyzed liquid phase carbonylation reactions, such as e.g. alcohol carbonylation, hydroformylation, Reppe carbonylations and Koch carbonylations. Thus, carbon dioxide will serve as the sole source of carbon monoxide, and any storage, transportation and handling thereof will be omitted. Furthermore, the presence of carbon dioxide in the reaction medium will provide the conditions for CXL, which will increase the reaction rate of the carbonylation reaction.

In the following, the hydroformylation reaction is used as an example to illustrate the invention.

Hydroformylation, also known as "oxo synthesis" or "oxo process", is an industrial process for the production of aldehydes from alkenes. More specifically, the hydroformylation reaction is the addition of carbon monoxide (CO) and hydrogen (H$_2$) to an alkene. This chemical reaction entails the net addition of a formyl group (CHO) and a hydrogen atom to a carbon-carbon double bond. The reaction yields an aldehyde with a carbon chain one unit longer than that of the parent alkene. If the aldehyde is the desired product, then the syngas should have a composition close to CO:H$_2$=1:1.

In some cases, the alcohol corresponding to the aldehyde is the desired product. When this is the case, more hydrogen is consumed to reduce the intermediate aldehyde to an alcohol, and therefore the syngas should have a composition of approximately CO:H$_2$=1:2.

Sometimes it is desired to purify the intermediate aldehyde before converting it into an alcohol. Accordingly, in such case, a syngas with the composition CO:H$_2$=1:1 must first be used, followed by pure H$_2$.

Thus, the need for low-module syngas (i.e. low hydrogen-to-carbon monoxide ratio) is characteristic for the hydroformylation reaction. Such a syngas composition is rather costly to provide since it cannot be obtained directly from steam reforming of natural gas or naphtha. At least a steam reformed gas must undergo reverse shift, i.e. the reaction CO$_2$+H$_2$→CO+H$_2$O, to provide sufficient CO. Otherwise, a cold box for condensing CO has to be installed to separate the CO. This is also a costly solution, and there will be an excess of hydrogen, for which a purpose for use has to be found.

Alternatively, gasification plants may provide low-module (i.e. CO-rich) syngas, but gasification plants need to be very large in order to be efficient, and they are also expensive, both with respect to CAPEX and to OPEX. Furthermore, coal-based gasification plants are increasingly undesired due to the substantial environmental implications and a large CO$_2$ footprint.

Low-module syngas for hydroformylation is therefore generally costly. Large hydroformylation plants are often placed in industrial areas and may thus obtain the necessary syngas "over the fence" from a nearby syngas producer. In many cases, however, this is not possible for medium or small size hydroformylation plants. Instead, such smaller plants will need to import the syngas, e.g. in gas cylinders, which is very expensive. Furthermore, transportation and handling of such gas containers is connected with certain elements of risk since syngas (not least low-module syngas) is highly toxic and extremely flammable, and syngas may form explosive mixtures with air. Import of CO by tube trailers will face similar challenges, both in terms of costs and in terms of safety.

Regarding prior art, U.S. Pat. No. 8,568,581 discloses a hydroformylation process using a traditional electrochemical cell, not a solid oxide electrolysis cell (SOEC) or an SOEC stack, for preparation of the synthesis gas to be used in the process. Water is introduced in a first (anode) compartment of the cell, and CO$_2$ is introduced into the second (cathode) compartment of the cell followed by alkene and catalyst addition to the cell, and the cathode induces liquid phase hydroformylation when an electrical potential is applied between the anode and the cathode.

In WO 2017/014635, a method for electrochemically reducing carbon dioxide is described. The method involves the conversion of $CO_2$ into one or more platform molecules such as syngas, alkenes, alcohols (including diols), aldehydes, ketones and carboxylic acids, and also conversion of $CO_2$ into i.a. CO, hydrogen and syngas. The method does not, however, include preparation of low-module syngas for hydroformylation.

US 2014/0291162 discloses a multi-step method for preparation of various compounds, such as aldehydes, by electrolysis of previously prepared $CO_2$ and/or CO and steam. The method includes i.a. heat transfer from a heating means towards a proton-conductive electrolyser comprising a proton-conducting membrane arranged between the anode and the cathode.

Applicant's WO 2013/164172 describes a process for the production of a chemical compound from a feed stream containing $CO_2$, said process comprising the steps of:

electrolyzing at least a part of the $CO_2$ in a solid oxide electrolysis cell (SOEC) to a first gas stream containing CO and a second gas stream containing $O_2$, adjusting the composition of the first gas stream or the second gas stream or both gas streams to include $CO_2$, either by operating at less than full conversion of $CO_2$ or by sweeping one or both gas streams with a gas containing $CO_2$ or by—at some stage between the electrolysis cell and the oxidative carbonylation reactor—diluting one or both gas streams with a gas containing $CO_2$, and introducing the first and second process stream into a reaction stage and reacting the first and second process stream combined or in succession with a substrate to the chemical compound by means of an oxidative carbonylation reaction with the CO and the $O_2$ contained in the process feed stream.

The invention described in WO 2013/164172 is thus based on the utilization of a combination of the two electrolysis streams (the CO-containing stream and the $O_2$-containing stream) for oxidative carbonylation reactions, while the present invention teaches how to obtain a suitable CO-containing stream by electrolysis to be used as one of the feed streams in carbonylation reactions.

Finally, US 2011/0253550 discloses a method for producing a synthetic material, where water is converted into $H_2$ and $O_2$ using high-temperature electrolysis. Depending on the way the catalytic process is carried out, the mixture of water vapor, $CO_2$ and $H_2$ can additionally be converted catalytically into functionalized hydrocarbons, such as aldehydes. This publication is very unspecific and does not define the concept of high-temperature electrolysis, neither in terms of temperature range nor in terms of the kind(s) of equipment being usable for the purpose.

DETAILED DESCRIPTION

Now it has turned out that the above-described elements of risk in relation to syngas can effectively be counteracted by generating the syngas, which is necessary for hydroformylation plants, in an apparatus based on solid oxide electrolysis cells (SOECs) or SOEC stacks. A solid oxide electrolysis cell is a solid oxide fuel cell (SOFC) run in reverse mode, which uses a solid oxide electrolyte to produce e.g. oxygen and hydrogen gas by electrolysis of water. Importantly, it can also be used for converting $CO_2$ electrochemically into the toxic, but for many reasons attractive CO directly at the site where the CO is to be used, which is an absolute advantage. The turn-on/turn-off of the apparatus is very swift, which is a further advantage.

Thus, co-electrolysis of water and carbon dioxide in an SOEC stack may produce a mixture of hydrogen and carbon monoxide in the desired ratio. If hydrogen is already available from other sources, then the SOEC may be used to generate carbon monoxide. This includes the option of preparing $H_2$ and CO in separate SOEC stacks. In practice it is usually desirable to operate the SOEC stack at less than full conversion and therefore the product gas will contain CO, $CO_2$ and optionally $H_2$ and $H_2O$. By cooling the raw product gas, most of the steam (if present) will condense, and it can then be separated from the gas stream as liquid water in a separator. The product gas may be further dried, e.g. over a drying column, if desired. The product gas will then contain CO, $CO_2$ and optionally $H_2$ as the main components. The separation of $CO_2$ from the reactive components CO and $H_2$ is more complicated and costly than the separation of water from the product gas. It can be done by using a PSA (pressure swing adsorption) unit, which unfortunately is quite expensive.

However, the presence of $CO_2$ in the hydroformylation reaction actually is an advantage: The hydroformylation reaction is carried out in a liquid medium, and pressurizing this liquid with $CO_2$ entails a $CO_2$-expanded liquid (CXL) as defined above. It has been described in the literature (see Fang et al., *Ind. Eng. Chem. Res.* 46 (2007) 8687-8692 and references therein) that CXL media alleviate mass transfer limitations in the hydroformylation reaction and increase the solubility of the reactant gases in the CXL medium compared to the neat liquid medium. As a result of this, the rate of the hydroformylation reaction may be increased by up to a factor of four in CXL-media compared to neat organic solvents. Furthermore, the n/iso ratio, i.e. the ratio between linear and branched aldehydes, may be improved by using a CXL solvent compared to using the neat solvent as taught in U.S. Pat. No. 7,365,234 B2.

Therefore, the present invention offers a way to provide a syngas with the appropriate $H_2$/CO ratio while at the same time providing the $CO_2$ needed for obtaining a $CO_2$-expanded liquid reaction medium for the hydroformylation process. If hydrogen is available from other sources, the present invention offers a way to provide a CO/$CO_2$-mixture which, when mixed with hydrogen, is suitable for carrying out the hydroformylation reaction in a CXL medium.

An example of an olefin used for the hydroformylation reaction is 1-octene, but in principle any olefin may be used according to the present invention. An example of a liquid solvent for the hydroformylation reaction is acetone, but a long range of other organic solvents may be used.

Many other catalyzed liquid-phase carbonylation processes are used industrially, and the present invention can be applied to all of them.

So it is the intention of the present invention to provide an apparatus generating syngas or a mixture of carbon oxides based on solid oxide electrolysis cells, which can generate syngas for hydroformylation plants or other plants which are based on synthesis with CO in the liquid phase. The raw materials for generating the syngas will be mixtures of $CO_2$ and optionally $H_2O$.

A solid oxide electrolysis cell system comprises an SOEC core, wherein the SOEC stack is housed together with inlets and outlets for process gases. The feed gas or "fuel gas" is led to the cathode part of the stack, from where the product gas from the electrolysis is taken out. The anode part of the stack is also called the oxygen side, because oxygen is produced on this side. In the stack, CO and $H_2$ are produced from a mixture of $CO_2$ and water, which is led to the fuel side of the stack with an applied current, and excess oxygen is transported to the oxygen side of the stack, optionally using air, nitrogen or carbon dioxide to flush the oxygen side.

More specifically, the principle of producing CO and $H_2$ by using a solid oxide electrolysis cell system consists in leading $CO_2$ and $H_2O$ to the fuel side of an SOEC with an applied current to convert $CO_2$ to CO and $H_2O$ to $H_2$ and transport the oxygen surplus to the oxygen side of the SOEC. Air, nitrogen or carbon dioxide may be used to flush the oxygen side. Flushing the oxygen side of the SOEC has two advantages, more specifically (1) reducing the oxygen concentration and related corrosive effects and (2) providing means for feeding energy into the SOEC, operating it endothermic. The product stream from the SOEC contains a mixture of CO, $H_2$, $H_2O$ and $CO_2$, which—after removal of water, e.g. by condensation—can be used directly in the hydroformylation reaction.

In one embodiment of the invention, CO and $H_2$ are both made by electrolysis, but in separate SOECs or SOEC stacks. This has the advantage that each SOEC or SOEC stack may be optimized for its specific use.

The present invention pertains not only to the hydroformylation reaction, but in principle to all catalyzed liquid phase reactions where CO is one of the reactant chemicals.

The overall principle in the production of CO by electrolysis is that $CO_2$ (possibly including some CO) is fed to the cathode. As current is applied to the stack, $CO_2$ is converted to CO to provide an output stream with a high concentration of CO:

$$2\ CO_2\ \text{(cathode)} \rightarrow 2\ CO\ \text{(cathode)} + O_2\ \text{(anode)} \qquad (1)$$

If pure $CO_2$ is fed into the SOEC stack, the output will be CO (converted from $CO_2$) and unconverted $CO_2$.

If a mixture of $CO_2$ and $H_2O$ is fed into the SOEC stack, the output will be a mixture of CO, $CO_2$, $H_2O$ and $H_2$. In addition to the electrochemical conversion reaction of $CO_2$ to CO (1) given above, steam will be electrochemically converted into gaseous hydrogen according to the following reaction:

$$H_2O\ \text{(cathode)} \rightarrow H_2\ \text{(cathode)} + 1/2\ O_2\ \text{(anode)} \qquad (2)$$

Additionally, a non-electrochemical process, namely the reverse water gas shift (RWGS) reaction, takes place within the pores of the cathode:

$$H_2\ \text{(cathode)} + CO_2\ \text{(cathode)} \leftrightarrow H_2O\ \text{(cathode)} + CO\ \text{(cathode)} \qquad (3)$$

In state-of-the-art SOEC stacks, where the cathode comprises Ni metal (typically a cermet of Ni and stabilized zirconia), the overpotential for reaction (1) is typically significantly higher than that for reaction (2). Furthermore, since Ni is a good catalyst for the RWGS reaction, reaction (3) occurs almost instantaneously at SOEC operating temperatures. In other words, the vast majority of the electrolysis current is used for converting $H_2O$ into $H_2$ (reaction 2), and the produced $H_2$ rapidly reacts with $CO_2$ (according to reaction 3) to provide a mixture of CO, $CO_2$, $H_2O$ and $H_2$. Under typical SOEC operating conditions, only a very small amount of CO is produced directly via electrochemical conversion of $CO_2$ into CO (reaction 1).

In case pure $H_2O$ is fed into the SOEC stack, the conversion $X_{H2O}$ of $H_2O$ to $H_2$ is given by Faraday's law of electrolysis:

$$X_{H_2O} = \frac{p_{H_2}}{p_{H_2} + p_{H_2O}} = \frac{i \cdot V_m \cdot n_{cells}}{z \cdot f_{H_2O} \cdot F} \qquad (4)$$

where $p_{H2}$ is the partial pressure of $H_2$ at cathode outlet, $p_{H2O}$ is the partial pressure of steam at cathode outlet, i is the electrolysis current, $V_m$ is the molar volume of gas at standard temperature and pressure, $n_{cells}$ is the number of cells in an SOEC stack, z is the number of electrons transferred in the electrochemical reaction, $f_{H2O}$ is the flow of gaseous steam into the stack (at standard temperature and pressure), and F is Faraday's constant.

In case pure $CO_2$ is fed into the SOEC stack, the conversion $X_{CO2}$ of $CO_2$ to CO is given by an analogous expression:

$$X_{CO_2} = \frac{p_{CO}}{p_{CO} + p_{CO_2}} = \frac{i \cdot V_m \cdot n_{cells}}{z \cdot f_{CO_2} \cdot F} \qquad (5)$$

where $p_{CO}$ is the partial pressure of CO at cathode outlet, $p_{CO2}$ is the partial pressure of $CO_2$ at cathode outlet, i is the electrolysis current, $V_m$ is the molar volume of gas at standard temperature and pressure, $n_{cells}$ is the number of cells in an SOEC stack, z is the number of electrons transferred in the electrochemical reaction, $f_{CO2}$ is the flow of gaseous $CO_2$ into the stack (at standard temperature and pressure), and F is Faraday's constant.

In case both steam and $CO_2$ is fed into the SOEC stack, the gas composition exiting the stack will further be affected by the RWGS reaction (3). The equilibrium constant for RWGS reaction, $K_{RWGS}$, is given by:

$$K_{RWGS} = \frac{p_{CO} \cdot p_{H_2O}}{p_{CO_2} \cdot p_{H_2}} = \exp\left(-\frac{\Delta G}{RT}\right) \qquad (6)$$

where $\Delta G$ is the Gibbs free energy of the reaction at SOEC operating temperature, R is the universal gas constant, and T is the absolute temperature.

The equilibrium constant, and therefore the extent to which electrochemically produced $H_2$ is used to convert $CO_2$ into CO, is temperature-dependent. For example, at 500° C., $K_{RWGS}=0.195$. At 600° C., $K_{RWGS}=0.374$. At 700° C., $K_{RWGS}=0.619$.

Thus, the present invention relates to a method for the generation of a gas mixture comprising carbon monoxide, carbon dioxide and optionally hydrogen for use in hydroformylation plants or in carbonylation plants, comprising the steps of:

optionally evaporating water to steam, mixing the optional steam with carbon dioxide in the desired molar ratio, and feeding the resulting gas to a solid oxide electrolysis cell (SOEC) or an SOEC stack at a sufficient temperature for the cell or cell stack to operate while supplying an electrical current to the cell or cell stack to effect a partial conversion of carbon dioxide to carbon monoxide and optionally of steam to hydrogen, wherein optionally some of or all the remaining steam is removed from the raw product gas stream by cooling the raw product gas stream allowing for condensation of at least part of the steam as liquid water and separating the remaining product gas from the liquid, and the gas mixture containing CO and $CO_2$ is used for liquid phase synthesis reactions, utilizing carbon monoxide as one of the reactants while recycling $CO_2$ to the SOEC.

For use in the hydroformylation reaction, the molar ratio between steam and carbon dioxide is preferably in the interval 0-2, more preferably in the interval 0-1.5 and most preferably in the interval 0-1, since this ratio will provide a syngas with a $CO:H_2$ ratio of 1.015:1 (see Example 4 below).

Preferably the temperature, at which CO is produced by electrolysis of $CO_2$ in the SOEC or SOEC stack, is around 700° C.

One of the great advantages of the method of the present invention is that the syngas can be generated with the use of virtually any desired $CO/H_2$ ratio, since this is simply a matter of adjusting the $CO_2/H_2O$ ratio of the feed gas.

Another great advantage of the invention is, as already mentioned, that the syngas can be generated "on-site", i.e. exactly where it is intended to be used, instead of having to transport the toxic and highly flammable syngas from the preparation site to the site of use.

Yet another advantage of the present invention is that if it is desired to switch between a $CO:H_2=1:1$ syngas and pure $H_2$, this can be done using the same apparatus, simply by adjusting the feed from $CO_2/H_2O$ to pure $H_2O$.

A further advantage of the present invention is that it provides a $CO/H_2$ stream diluted in $CO_2$, which enables the subsequent hydroformylation reaction to be carried out in a $CO_2$-expanded liquid (CXL) reaction medium. This advantage embraces higher reaction rates, improved selectivity (n/iso ratio) at mild conditions (lower temperature and lower pressure) compared to hydroformylation in neat liquid media. Similar advantages in other carbonylation reactions are to be expected.

A still further advantage of the present invention is that syngas of high purity can be produced without being more expensive than normal syngas in any way, even though this desired high purity would prima facie be expected to entail increasing production costs. This is because the purity of the syngas is largely determined by the purity of the $CO_2/H_2O$ feed, and provided that a feed consisting of food grade or beverage grade $CO_2$ and ion-exchanged water is chosen, very pure syngas can be produced.

The invention is illustrated further in the examples which follow.

Example 1

$CO_2$ Electrolysis

An SOEC stack consisting of 75 cells is operated at an average temperature of 700° C. with pure $CO_2$ being fed to the cathode at a flow rate of 100 Nl/min $CO_2$, while applying an electrolysis current of 50 A. Based on equation (5) above, the conversion of $CO_2$ under such conditions is 26%, i.e. the gas exiting the cathode side of the stack consists of 26% CO and 74% $CO_2$.

Example 2

$H_2O$ Electrolysis

An SOEC stack consisting of 75 cells is operated at an average temperature of 700° C. with pure steam being fed to the cathode at a flow rate of 100 Nl/min steam (corresponding to a liquid water flow rate of approximately 80 g/min), while applying an electrolysis current of 50 A. Based on equation (4) above, the conversion of $H_2O$ under such conditions is 26%, i.e. the gas exiting the cathode side of the stack consists of 26% $H_2$ and 74% $H_2O$.

Example 3

Co-Electrolysis

An SOEC stack, consisting of 75 cells, is operated at an average temperature of 700° C. with a mixture of steam and $CO_2$ being fed to the cathode in a molar ratio of 1:1 with a total flow rate of 100 Nl/min, while applying an electrolysis current of 50 A. In the stack, steam is electrochemically converted into $H_2$ according to reaction (2) above. Assuming that P electrochemical conversion of $CO_2$ via reaction (1) is negligible, 52% of the fed steam is electrochemically converted into hydrogen. Were the RWGS reaction not present, the gas exiting the stack would have the following composition: 0% CO, 50% $CO_2$, 26% $H_2$ and 24% $H_2O$. However, due to the RWGS reaction, some of the produced hydrogen will be used to generate CO. Therefore, the gas exiting the stack will actually have the following composition: 10.7% CO, 39.3% $CO_2$, 15.3% $H_2$ and 34.7% $H_2O$. The ratio of $CO:H_2$ in the product gas is thus 1:1.43.

Example 4

Co-Electrolysis

An SOEC stack consisting of 75 cells is operated at an average temperature of 700° C. with a mixture of steam and $CO_2$ being fed to the cathode in a molar ratio of 41:59 with a total flow rate of 100 Nl/min, while applying an electrolysis current of 50 A. In the stack, steam is electrochemically converted into $H_2$ according to reaction (2) above. Assuming that electrochemical conversion of $CO_2$ via reaction (1) is negligible, 64% of the fed steam is electrochemically converted into hydrogen. Were the RWGS reaction not present, the gas exiting the stack would have the following composition: 0% CO, 59% $CO_2$, 26% $H_2$ and 15% $H_2O$. However, due to the RWGS reaction, some of the produced hydrogen will be used to generate CO. Therefore, the gas exiting the stack will actually have the following composition: 13.2% CO, 45.8% $CO_2$, 13.0% $H_2$ and 28.0% $H_2O$. The ratio of $CO:H_2$ in the product gas is thus 1.015:1.

The invention claimed is:

1. A method for the generation of a gas mixture comprising carbon monoxide, carbon dioxide, and hydrogen for use in hydroformylation plants or in carbonylation plants, comprising the steps of:

evaporating water to steam, mixing the steam with carbon dioxide in a desired molar ratio to form a resulting gas, and feeding the resulting gas to a solid oxide electrolysis cell (SOEC) or an SOEC stack at a sufficient temperature for the SOEC or SOEC stack to operate while supplying an electrical current to the SOEC or SOEC stack to effect a partial conversion of carbon dioxide to carbon monoxide and of steam to hydrogen forming a raw product gas comprising CO, $H_2$, and $CO_2$ on a cathode side of the SOEC or SOEC stack, and forming anode side gas comprising $O_2$ on an anode side of the SOEC or SOEC stack, removing some of or all remaining steam from the raw product gas by cooling the raw product gas allowing for condensation of at least part of the steam as liquid water and separating a remaining product gas comprising CO, $H_2$, and $CO_2$ from the liquid water, and using the remaining product gas for a liquid phase er carbonylation, the carbonylation utilizing carbon monoxide as a reactant in the carbonylation, while utilizing the $CO_2$ to form a $CO_2$-expanded liquid (CXL) reaction medium for carbonylation, wherein the SOEC or SOEC stack is operated to perform a reverse water gas shift (RWGS) reaction within pores of a cathode of the SOEC or SOEC stack converting $CO_2$ and $H_2$ to CO and $H_2O$.

2. The method according to claim 1, wherein a molar ratio between steam and carbon dioxide in the resulting gas is in the interval 0-3.

3. The method according to claim 1, wherein the temperature, at which CO is produced by electrolysis of $CO_2$ in the SOEC or SOEC stack, is around 700° C.

4. The method according to claim 1, wherein a molar ratio between steam and carbon dioxide in the resulting gas is in the interval 0-2.

5. The method according to claim 1, wherein a molar ratio between steam and carbon dioxide in the resulting gas is in the interval 0-1.5.

6. The method according to claim 1, further comprising recycling $CO_2$ remaining from after the carbonylation to the SOEC or SOEC stack.

7. The method according to claim 1, comprising utilizing carbon monoxide and hydrogen as reactants in hydroformylation.

8. The method according to claim 1, wherein the liquid phase carbonylation is a liquid phase hydroformylation.

\* \* \* \* \*